United States Patent
Fleming et al.

(10) Patent No.: US 9,377,297 B2
(45) Date of Patent: Jun. 28, 2016

(54) HIGH-RESOLUTION IMAGING AND PROCESSING METHOD AND SYSTEM FOR INCREASING THE RANGE OF A GEOMETRIC DIMENSION OF A PART THAT CAN BE DETERMINED

(71) Applicant: GII Acquisition, LLC, Davisburg, MI (US)

(72) Inventors: Christopher C. Fleming, Howell, MI (US); Michael G. Nygaard, Fenton, MI (US)

(73) Assignee: GII ACQUISITION, LLC, Davisburg, MI (US)

( * ) Notice: Subject to any disclaimer, the term of this patent is extended or adjusted under 35 U.S.C. 154(b) by 408 days.

(21) Appl. No.: 13/972,194

(22) Filed: Aug. 21, 2013

(65) Prior Publication Data

US 2015/0055145 A1    Feb. 26, 2015

(51) Int. Cl.
 *G01B 11/14* (2006.01)
 *G01B 11/24* (2006.01)
 *G01B 11/02* (2006.01)

(52) U.S. Cl.
 CPC ............ *G01B 11/2433* (2013.01); *G01B 11/02* (2013.01)

(58) Field of Classification Search
 USPC .......... 356/625–640, 391–394, 237.2–237.3, 356/23.4
 See application file for complete search history.

(56) References Cited

U.S. PATENT DOCUMENTS

| | | | |
|---|---|---|---|
| 3,924,953 A | 12/1975 | Allard | |
| 4,315,688 A | 2/1982 | Pryor | |
| 4,598,998 A | 7/1986 | Kamel et al. | |
| 4,644,394 A | 2/1987 | Reeves | |
| 4,721,388 A | 1/1988 | Takagi et al. | |
| 4,831,251 A | 5/1989 | Hanna | |
| 4,852,983 A | 8/1989 | Fein | |
| 4,906,098 A | 3/1990 | Thomas et al. | |
| 4,923,066 A | 5/1990 | Ophir et al. | |

(Continued)

FOREIGN PATENT DOCUMENTS

| WO | 2005022076 A2 | 3/2005 |
|---|---|---|
| WO | 2009130062 A1 | 10/2009 |

OTHER PUBLICATIONS

International Search Report and Written Opinion; corresponding international application No. PCT/US2014/035626; date of mailing Mar. 10, 2015.

(Continued)

*Primary Examiner* — Tri T Ton
(74) *Attorney, Agent, or Firm* — Brooks Kushman P.C.

(57) ABSTRACT

A high-resolution imaging and processing method and system for increasing the range of a geometric dimension of a part that can be determined are provided. The method includes directing at least one plane of collimated radiation at a surface of the part. Each of the planes is occluded by the part to create unobstructed first and second planar portions of the plane of radiation. Each of the first and second planar portions has a width and contains an amount of radiation which is representative of a respective geometric dimension of the supported part to be determined. The method includes increasing the width and decreasing the intensity of the first and second planar portions imaged on a plurality of predetermined measuring areas to obtain respective elongated planar portions and to produce respective electrical signals. The electrical signals are processed to determine the geometric dimension with enhanced accuracy.

20 Claims, 6 Drawing Sheets

(56) References Cited

U.S. PATENT DOCUMENTS

| | | | |
|---|---|---|---|
| 4,969,746 A | 11/1990 | McConnell et al. |
| 5,012,117 A | 4/1991 | Karafa et al. |
| 5,142,559 A | 8/1992 | Wielopolski et al. |
| 5,164,995 A | 11/1992 | Brooks et al. |
| 5,168,458 A | 12/1992 | Gomes |
| 5,170,306 A | 12/1992 | Gomes |
| 5,291,272 A | 3/1994 | Demirsu |
| 5,383,021 A | 1/1995 | Hanna |
| 5,521,707 A | 5/1996 | Castore et al. |
| 5,568,263 A | 10/1996 | Hanna |
| 5,608,530 A | 3/1997 | Gates |
| 5,646,724 A | 7/1997 | Hershline |
| 6,055,329 A | 4/2000 | Mufti |
| 6,252,661 B1 | 6/2001 | Hanna |
| 6,285,034 B1 | 9/2001 | Hanna et al. |
| 6,289,600 B1 | 9/2001 | Watts |
| 6,313,948 B1 | 11/2001 | Hanna |
| 6,959,108 B1 | 10/2005 | Bartelt et al. |
| 7,312,607 B2 | 12/2007 | Nygaard |
| 7,403,872 B1 | 7/2008 | St. Onge et al. |
| 7,633,046 B2 | 12/2009 | Spalding |
| 7,633,634 B2 | 12/2009 | Spalding et al. |
| 7,633,635 B2 | 12/2009 | Nygaard et al. |
| 7,684,054 B2 | 3/2010 | Crowther |
| 7,738,088 B2 | 6/2010 | Spalding |
| 7,738,121 B2 | 6/2010 | Spalding |
| 7,755,754 B2 | 7/2010 | Spalding |
| 7,777,900 B2 | 8/2010 | Nygaard et al. |
| 7,796,278 B2 | 9/2010 | Spalding et al. |
| 7,812,970 B2 | 10/2010 | Nygaard |
| 7,920,278 B2 | 4/2011 | Nygaard |
| 8,054,460 B2 | 11/2011 | Agapiou et al. |
| 8,179,434 B2 | 5/2012 | Koval et al. |
| 2005/0174567 A1 | 8/2005 | Hanna |
| 2005/0213113 A1 | 9/2005 | Sikora et al. |
| 2006/0236792 A1 | 10/2006 | Hanna |
| 2009/0103107 A1 | 4/2009 | Nygaard |
| 2010/0201806 A1 | 8/2010 | Nygaard et al. |
| 2010/0207989 A1 | 8/2010 | Govyadinov |
| 2010/0245850 A1 | 9/2010 | Lee et al. |
| 2012/0105429 A1 | 5/2012 | Nygaard |
| 2012/0293623 A1 | 11/2012 | Nygaard |
| 2012/0293789 A1 | 11/2012 | Nygaard |

OTHER PUBLICATIONS

International Preliminary Report on Patentability; corresponding international application No. PCT/US2014/035626; date of issuance of report Feb. 23, 2016.

FIG. 9 *(PRIOR ART)*

HIGH-RESOLUTION IMAGING AND PROCESSING METHOD AND SYSTEM FOR INCREASING THE RANGE OF A GEOMETRIC DIMENSION OF A PART THAT CAN BE DETERMINED

TECHNICAL FIELD

This invention relates, in general, to the field of non-contact, optical imaging of parts and, more particularly, to high-resolution methods and systems for optically imaging parts, such as ammunition cases and threaded fasteners, to increase the range of geometric dimensions of the parts that can be determined.

OVERVIEW

Traditional manual, gauging devices and techniques have been replaced to some extent by automatic inspection methods and systems. However, such automatic inspection methods and systems still have a number of shortcomings associated with them. For example, it is often difficult to "see" or measure smaller details of the parts.

The assignee of the present application has patented and created several laser inspection instruments that utilize a common laser head to measure parts. These laser heads include typically one or more light sources and sensors that together facilitate precise non-contact measurement of parts. However, there is an ongoing need for laser heads including one or more sensors which increase the accuracy and effective measurement range of laser heads.

A current laser/sensor configuration of the assignee includes two sensors for each laser light source. The light from a laser is processed through optics to form a line or plane of collimated light. This light passes over the measured part and falls upon the two sensors, one for each side of the part. Each sensor is perpendicular to the collimated light such that one side of a shadow cast by the part falls on each of the two sensors. The sensors are placed as close together as possible but there is still typically a small gap between them. FIG. 1 illustrates this configuration.

Each sensor includes a photo sensor that measures the amount of light it receives. The wider the part, the less light reaches the sensor and vice versa. The correlation between light received and part width is calibrated allowing the part to be measured according to the size of the shadow on the sensors. Because the collimated light is perpendicular to the sensor, the width of the part's shadow cast on the sensors is the same as the width of the part.

FIG. 9 shows a prior art system of U.S. Pat. No. 5,608,530 wherein mirrors are used to change the direction of light passing by a part.

U.S. Pat. No. 4,923,066 discloses an automatic visual inspection system for small arms ammunition which sorts visual surface flaws at high speed according to established standards which can be tailored to fit specific needs.

U.S. Pat. No. 7,403,872 discloses a method and system for inspecting manufactured parts such as cartridges and cartridge cases and sorting the inspected parts.

WO 2005/022076 discloses a plurality of light line generators which generate associated beams of light that intersect a part to be inspected.

U.S. Pat. No. 6,313,948 discloses an optical beam shaper for production of a uniform sheet of light for use in a parts inspection system having a light source including a coherent light generator, a diffractive beam shaper, and lens elements.

U.S. Pat. No. 6,285,034 discloses an inspection system for evaluating rotationally asymmetric workpieces for conformance to configuration criteria.

U.S. Pat. No. 6,252,661 discloses an inspection system for evaluating workpieces for conformance to configuration criteria.

U.S. Pat. No. 6,959,108 discloses an inspection system wherein workpieces to be inspected are consecutively and automatically launched to pass unsupported through the field of view of a plurality of cameras.

U.S. Pat. No. 4,831,251 discloses an optical device for discriminating threaded workpiece by the handedness by their screw thread profiles.

U.S. Pat. No. 5,383,021 discloses a non-contact inspection system capable of evaluating spatial form parameters of a workpiece to provide inspection of parts in production.

U.S. Pat. No. 5,568,263 also discloses a non-contact inspection system capable of evaluating spatial form parameters of a workpiece to provide inspection of parts in production.

U.S. Pat. No. 4,852,983 discloses an optical system which simulates the optical effect of traveling over a large distance on light traveling between reference surfaces.

U.S. Patent Application Publication No. 2005/0174567 discloses a system to determine the presence of cracks in parts.

U.S. Patent Application Publication No. 2006/0236792 discloses an inspection station for a workpiece including a conveyor, a mechanism for rotating the workpiece, and a probe.

U.S. Pat. No. 6,289,600 discloses a non-contact measuring device for determining the dimensions of a cylindrical object, such as a pipe.

U.S. Pat. No. 5,521,707 discloses a non-contact laser-based sensor guided by a precision mechanical system to scan a thread form producing a set of digitized images of the thread form.

WO 2009/130062 discloses a method and a device for the optical viewing of objects.

U.S. Pat. Nos. 5,168,458 and 5,170,306 disclose methods and systems for gauging threaded fasteners to obtain trilobular parameters.

Other U.S. patent documents related to the invention include: U.S. Pat. Nos. 4,315,688; 4,598,998; 4,644,394; 4,852,983; 4,906,098; 5,521,707; 5,608,530; 5,646,724; 5,291,272; 6,055,329; 4,983,043; 3,924,953; 5,164,995; 4,721,388; 4,969,746; 5,012,117; 7,684,054; 7,403,872; 7,633,635; 7,312,607, 7,777,900; 7,633,046; 7,633,634; 7,738,121; 7,755,754; 7,738,088; 7,796,278; 8,054,460; 8,179,434 and U.S. published patent applications 2010/0245850, 2010/0201806, 2012/0293623; 2012/0105429; and 2012/0293789.

For purposes of this application and for clarity, the photo sensors or photodetectors of this application are drawn as rectangles implying that they are some kind of photocell. In reality, they can be any device that measures intensity of light. Some examples are:

Area (Photocell): This is a device that generates variable voltages depending on the amount of light it receives. It receives light over an area.

Line (Linear Sensor Array): Conceptually this is a linear array of photo sensors. Each photo sensor measures the intensity of a point of light and acts independently allowing the sensor to measure both the total amount of light and position of the light that it receives.

Point (Photodiode): A photo diode is functionally the same as a photocell except that it measures light that falls on a point (or essentially a point) rather than an area.

Both area and line sensors can be directly substituted for the sensor rectangles in the drawing figures of this application. Point light sensors require more processing. The light passing by the part must somehow be focused onto the point sensor. There are a variety of ways this can be done and one possible configuration is illustrated in FIG. 9. For clarity only one sensor on one side is shown in FIG. 9 though this can be repeated for all sensors.

SUMMARY OF EXAMPLE EMBODIMENTS

An object of at least one embodiment of the present invention is to increase the range of a geometric dimension of a part that can be optically determined in a high-resolution imaging and processing method and system.

In carrying out the above object and other objects of at least one embodiment of the present invention, a high-resolution imaging and processing method of increasing the range of a geometric dimension of a part that can be determined is provided. The method includes the steps of supporting a part having a width and directing at least one plane of collimated radiation in a sensing direction at a surface of the part. Each of the planes is occluded by the part to create unobstructed first and second planar portions of the plane of radiation passing by and not blocked by the supported part and to cast a radiation shadow of the supported part. Each of the first and second planar portions has a width and contains an amount of radiation which is representative of a respective geometric dimension of the supported part to be determined. The method also includes measuring the amount of radiation in each of the first and second planar portions imaged on first and second predetermined measuring areas, respectively, to determine the geometric dimension. The improvement includes increasing the width and decreasing the intensity of the first and second planar portions imaged on the first and second predetermined measuring areas, respectively, to obtain elongated first and second planar portions, respectively, and to produce first and second electrical signals, respectively. The improvement also includes providing third and fourth predetermined measuring areas adjacent the first and second predetermined measuring areas, respectively, to image at least a portion of the elongated first and second planar portions, respectively, thereon and to produce third and fourth electrical signals, respectively. The improvement further includes processing the first, second, third and fourth electrical signals to determine the geometric dimension with enhanced accuracy.

The first and third measuring areas may be staggered and the second and fourth measuring areas may be staggered.

The first and third measuring areas may be angled at a first angle with respect to the width of the part and the second and fourth measuring areas may be angled at the same second angle with respect to the width of the part.

The first and second angles may be substantially equal. The first and second measuring areas may be substantially perpendicular to each other and the third and fourth measuring areas may be substantially perpendicular to each other.

There may be substantially no gap between the first and second measuring areas on which to cast the radiation shadow.

The radiation may be laser radiation, visible radiation and/or light radiation.

Further in carrying out the above object and other objects of at least one embodiment of the present invention, a high-resolution imaging and processing system for increasing the range of a geometric dimension of a part that can be determined in the system is provided. The system includes a support for supporting a part having a width along a measurement axis and at least one transmitter-receiver pair. Each pair includes a radiation source for directing a plane of collimated radiation at a surface of the part so that the part occludes each plane of radiation to create unobstructed first and second portions of the plane of radiation passing by and not blocked by the supported part and to cast a radiation shadow of the supported part. Each of the unobstructed first and second planar portions has a width and contains an amount of radiation which is representative of a respective geometric dimension of the part to be determined. Each pair also includes a receiver module for measuring the amount of radiation in the unobstructed first and second planar portions imaged on first and second predetermined measuring areas, respectively. The improvement includes means or mechanism for increasing the width and decreasing the intensity of the first and second planar portions imaged on the first and second predetermined measuring areas, respectively, to produce first and second electrical signals, respectively. Also included are third and fourth predetermined measuring areas, respectively, adjacent to the first and second measuring areas, respectively, to image at least a portion of the first and second planar portions, respectively, to produce third and fourth electrical signals, respectively. At least one processor processes the first, second, third and fourth electrical signals to determine the geometric dimension with enhanced accuracy.

The first and third measuring areas may be staggered and the second and fourth measuring areas may be staggered.

The first and third measuring areas may be angled at a first angle with respect to the width of the part and the second and fourth measuring areas may be angled at a second angle with respect to the width of the part.

The first and second angles may be substantially equal.

The first and second measuring areas may be substantially perpendicular to each other and the third and fourth measuring areas may be substantially perpendicular to each other.

Photodetectors may have each of the predetermined measuring areas.

The photodetectors may comprise at least one of photocells, linear sensor arrays and photodiodes.

The system may include an actuator mechanism for moving each pair in unison relative in the part to scan the part with each plane of radiation.

The radiation may be laser radiation, visible radiation and/or light radiation.

BRIEF DESCRIPTION OF THE DRAWINGS

For a more complete understanding of the present invention, and for further features and advantages thereof, reference is made to the following description taken in conjunction with the accompanying drawings, in which:

FIG. 9 is a top plan schematic view of a prior art point sensor system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, and as described below, at least one embodiment of the present invention provides a high-resolution imaging and processing method and system for determining a geometric dimension of a part such as a manufactured part. The part, such as a threaded fastener, has a length, a width, a part axis and an outer peripheral surface which extends 360° around the part.

Figure 1:
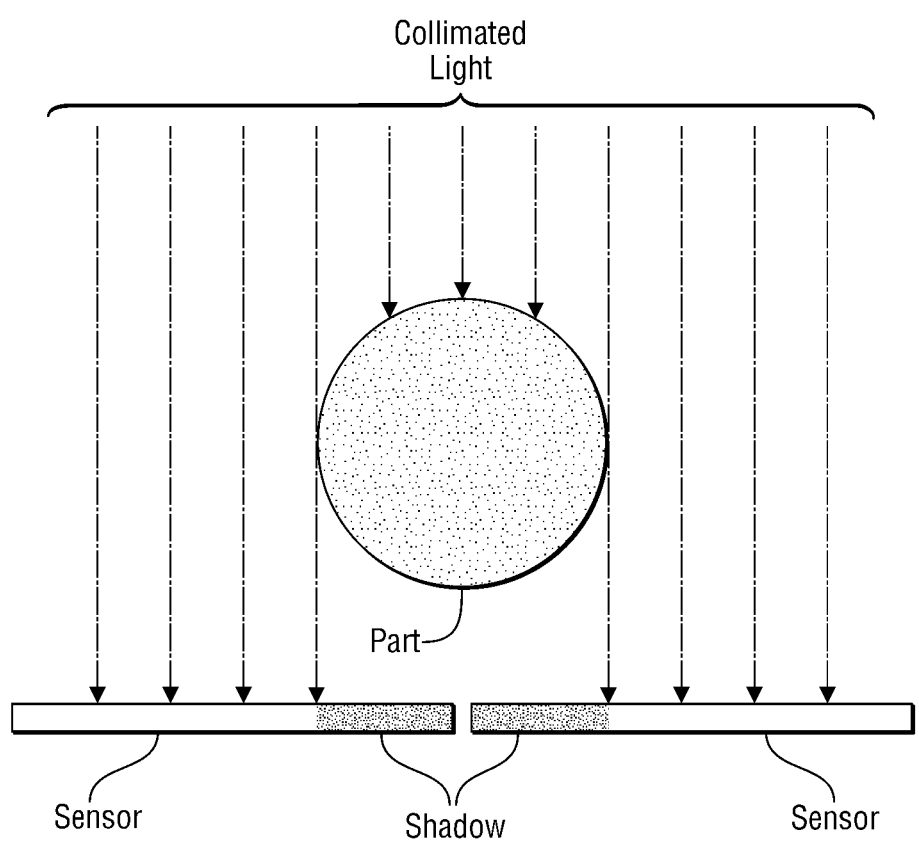
FIG. 1 is a top plan schematic view illustrating a method and prior art method and system for measuring a geometric dimension of a part.
Figure 2:
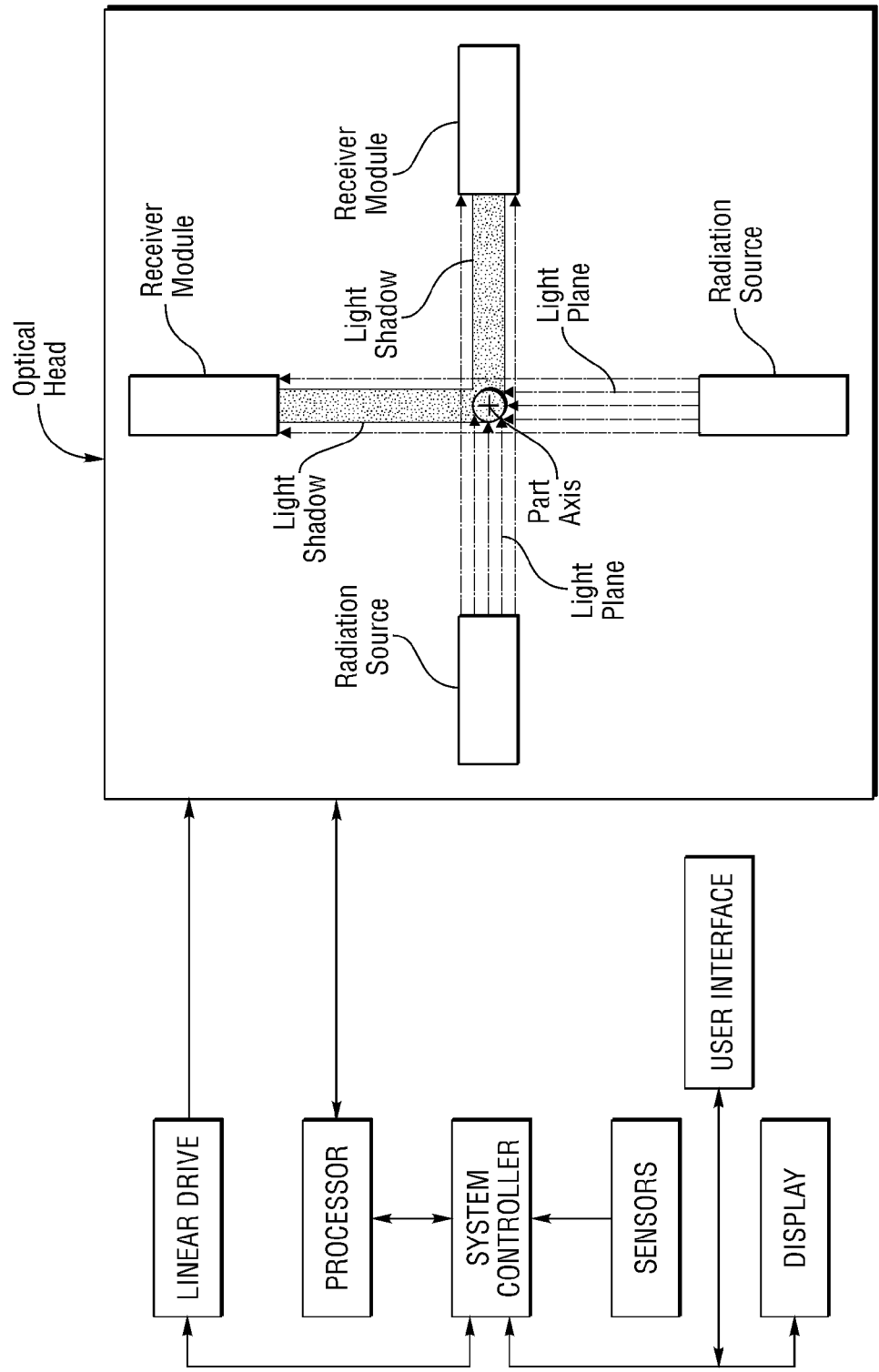
FIG. 2 is a top plan schematic view illustrating a method and system for determining a geometric dimension of a part utilizing at least one embodiment of the present invention.

Referring now to FIG. 2, a part such as a threaded bolt may be supported by a chuck or fixture of a part holder, as described in detail in U.S. Pat. No. 7,812,970. The head of the bolt is supported by and disposed within the fixture. The threads of the bolt may be optically inspected in an embodiment of the method and system of the present invention. Other parts, such as ammunition cases can be supported in a similar or slightly different fashion. Alternatively, such parts can travel down a track and the rest of the system can be stationary.

As shown in FIG. 2, the system includes at least one transmitter-receiver pair, and preferably, a plurality of such pairs. Each pair includes a radiation source for directing a plane of collimated radiation at the supported part so that the part occludes each plane of radiation to create unobstructed first and second planar portions of the plane of radiation passing by and not blocked by the supported part. Each of the unobstructed first and second planar portions has a width and contains an amount of radiation which is representative of a respective geometric dimension of the part to be determined. Each pair further also includes a receiver module for measuring the amount of radiation present in each of the unobstructed first and second planar portions imaged on first and second predetermined measuring areas, respectively, to determine the geometric dimension.

The system may further include an actuator mechanism such as a linear drive under control of a system controller for moving an optical head and each supported transmitter-receiver pair in unison relative to the supported part to scan the at least one plane of collimated radiation in a scanning direction at a surface of the part. However, it is to be understood that the supported part may move relative to the transmitter-receiver pair. For example, the part may travel down a track relative to stationary transmitter-receiver pairs.

The system may further include one or more processors under control of the system controller to process the resulting sets of 2-D profile signals to obtain measurements of the parts as described in U.S. Pat. No. 7,812,970. As shown in FIG. 2, the system may also include sensors including a linear encoder, a user interface and a display as described in U.S. Pat. No. 7,812,970.

There are at least two types of improvements to the methods and systems of the prior art described herein:

1) Improvements to magnify (or spread out) the image of the part. Magnifying or splitting the image of a part allows measurements to be calculated more accurately.

2) Improvements to increase the area covered by sensors. The effective sizes of the photo sensors or detectors are increased to accommodate such magnified or split part images.

Sensor Design Improvements to Magnify Part Images

A new sensor design is best described in multiple parts because each part adds an improvement to the sensor design. Each of the parts can be implemented separately but may be combined in a single design as described herein.

At least one embodiment of the present invention increases the sensitivity of the laser sensors. The current sensor design measures using a 1:1 part-width-to-shadow ratio. By increasing the ratio (i.e. magnifying the image) to 1:X (x>1) the shadow of the part will be magnified so that small details in the part will produce large details in the part's shadow. This will allow the sensors to produce more accurate and consistent measurements.

There are multiple ways in which the (shadow) image of a part can be magnified in a way that is suitable for detailed measurements.

Using Angled Photo Sensors or Detectors

The design change is to rotate the sensors so that they are at a more than 90 degree angle to the collimated light. This has the effect of elongating (magnifying) the shadow as illustrated in FIG. 3.

Figure 3:
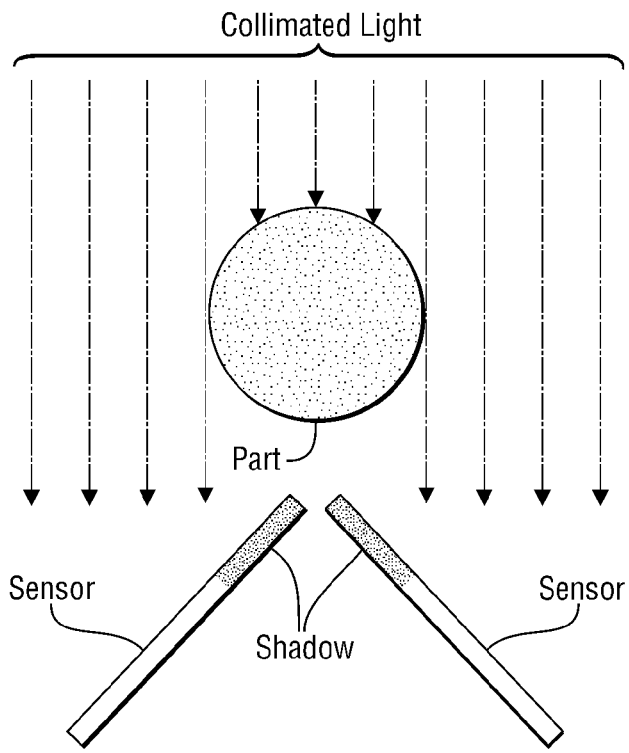
FIG. 3 is a top plan schematic view of a cylindrical part illuminated with collimated light and a pair of angled photo sensors or detectors of at least one embodiment of the present invention.

FIG. 3 illustrates the angle as rotated 45 degrees from perpendicular. However, a rotation of any angle will magnify the shadow. The more the sensor is rotated the more the shadow is multiplied though there are obvious problems as the rotation angle approaches 90 degrees.

Figure 4A:
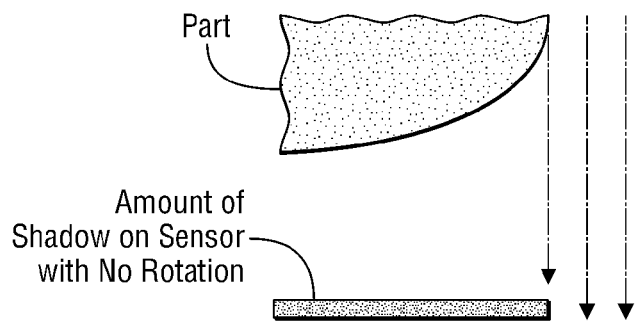
FIG. 4a is a top plan schematic view, partially broken away, of a part and collimated radiation with a non-rotated sensor.
Figure 4B:
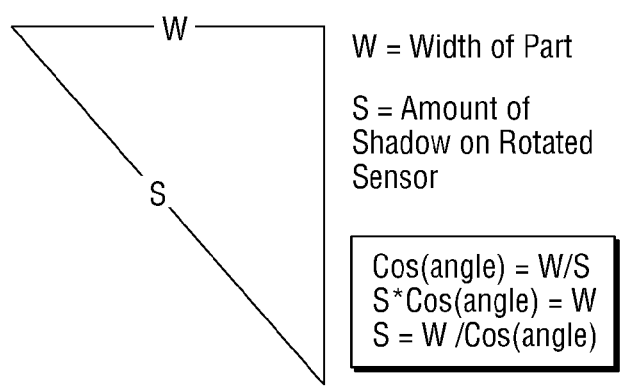
FIG. 4b shows a dimension of the part and shadow cast on an angled sensor with associated calculations.

Calculations show that the amount of shadow magnification is 1/cos (rotation angle). This is illustrated in FIGS. 4a and 4b.

The following table shows some example angle vs. magnification for selected angles.

| Angle (degrees) | Magnification |
| --- | --- |
| 30 | 1.15 |
| 45 | 1.41 |
| 60 | 2.0 |

Using Optics

Figure 5:
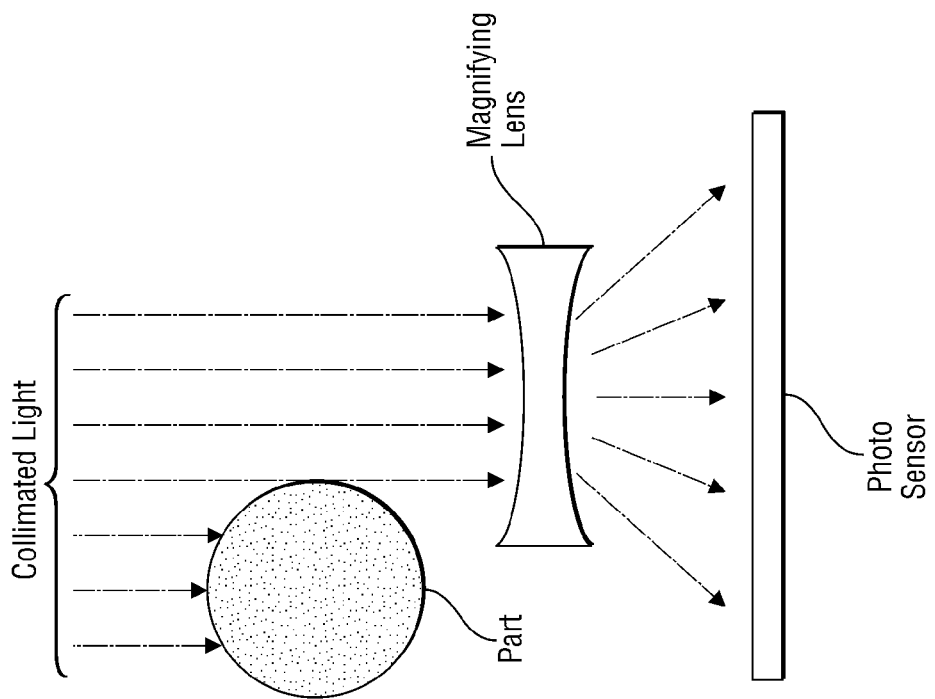
FIG. 5 is a top plan schematic view of another embodiment for spreading or magnifying collimated light passing by a part.

This method of magnifying a part image uses optical elements in the form of lenses. The image of the part passes through a magnifying lens and then to a suitable sensor or sensors. FIG. 5 illustrates this configuration. For clarity only one side of the sensor configuration is shown in FIG. 5.

Combinations

Figure 6:
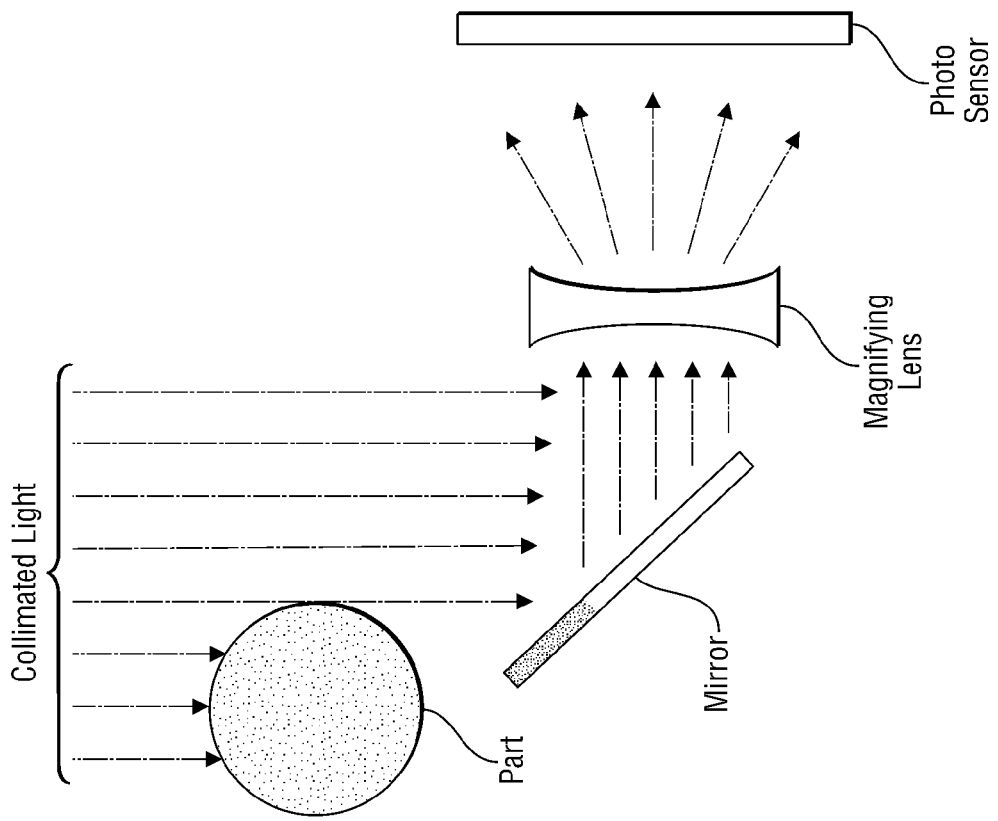
FIG. 6 is a top plan schematic view of yet another embodiment wherein the sensor is substantially parallel to the generated collimated light.

The previous image magnification methods can be combined in any order to increase the magnification. FIG. 6 illustrates one possible combined configuration. In FIG. 6, the image of the part is magnified 2× by angling the mirror (assuming a rotation of 60 degrees) plus an additional magnification from the magnifying lens.

A gist of at least one embodiment of the present invention is to spread out (magnify) at least one laser line segment or plane of collimated radiation so it can be measured in greater detail using multiple photo-diodes. Magnification of the line segment can be done either by angling mirrors/detectors or through the use of magnifying optics. It is not strictly necessary to magnify the line segment in order to use multiple photo-diodes. The line segment could simply be split into multiple sub-segments and each sub-segments sent to a photo-diode. In this embodiment, multiple photo-diodes are used in order to measure with greater resolution.

Photo Sensor or Detector Design Improvements to Increase Measurement Width

The above-described improvements increase the measurement capacity of receiver modules which include sensors or photodiodes by allowing wider parts to be measured.

Angling the sensors has the benefit of increasing the sensitivity of the sensor by magnifying the shadow but has the downside of reducing the effective width of the sensor. The following table shows the magnitude of this effect for selected angles.

| Angle (degrees) | Effective Width Reduction Factor |
|---|---|
| 30 | 0.87 |
| 45 | 0.71 |
| 60 | 0.50 |

Rotating the sensor 60 degrees doubles the sensitivity but also cuts in half the maximum width of parts that can be measured.

Figure 7:
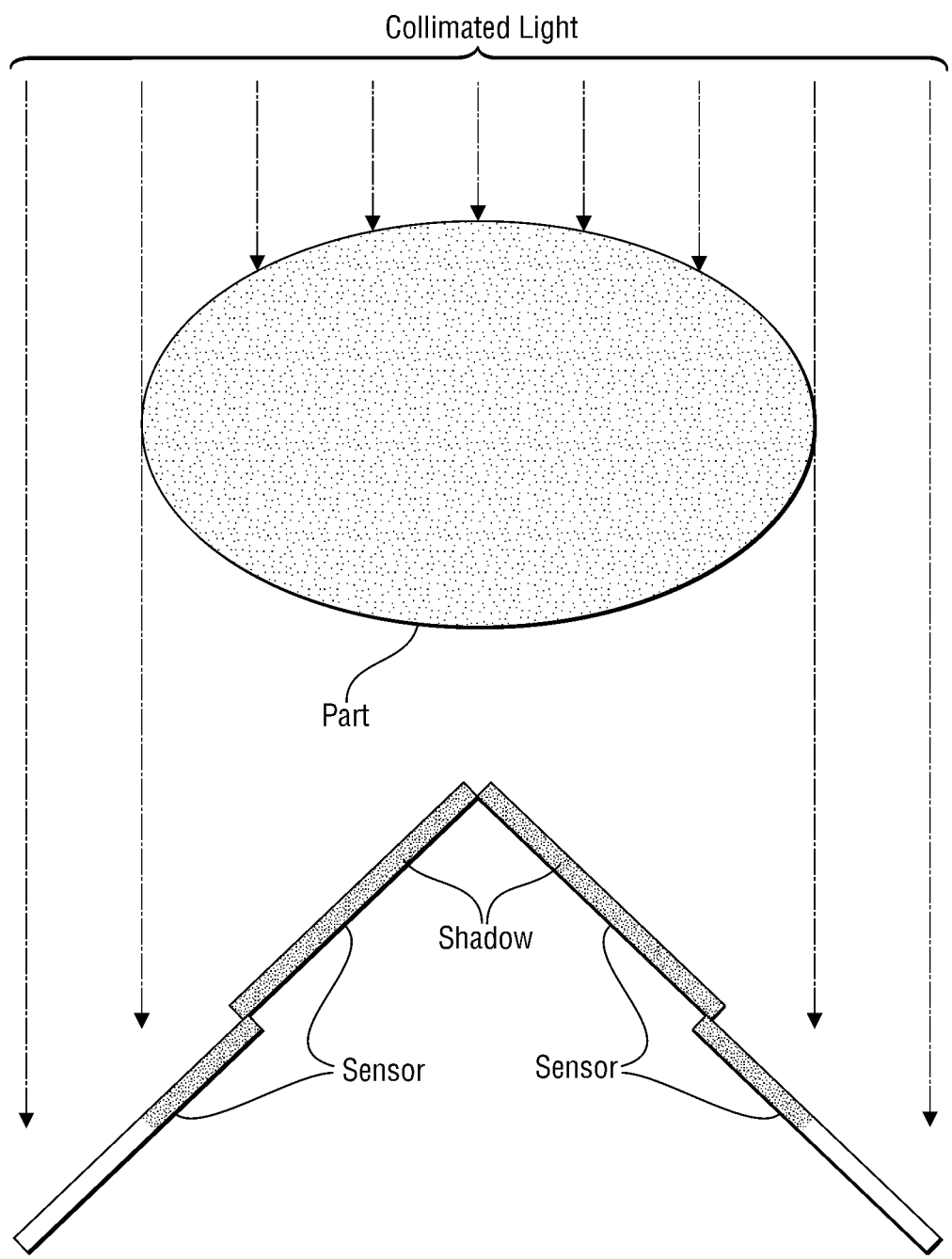
FIG. 7 is a top plan schematic view of yet another embodiment wherein the angled sensors are staggered.

One solution to this is to use multiple sensors that are staggered to increase the width of shadows that can be measured. This is illustrated in FIG. 7.

Staggering the sensors causes the shadow of the part to spill over to a lower adjacent sensor if it is wider than the previous sensor. The electrical signal outputs from the sensors are added together to form the net measurement. Any number of sensors can be combined in the staggered formation allowing the maximum width of measureable parts to be limited only by the number of staggered sensors rather than the width of a single sensor.

Photo Sensor or Detector Design Improvement to Eliminate the "Gap" Between Sensors This improvement increases the measurement capacity of the sensor by allowing narrower parts to be measured.

Figure 8:
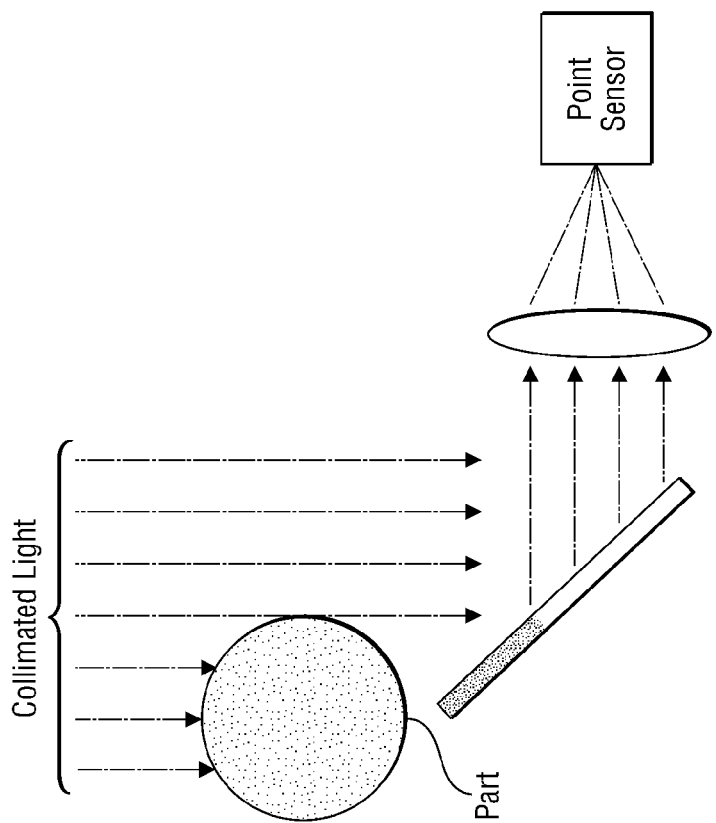
FIG. 8 is a view similar to the view of FIG. 7 wherein two adjacent sensors overlap in the shadow cast by the part to eliminate any gap between the sensors.
Figure 8:
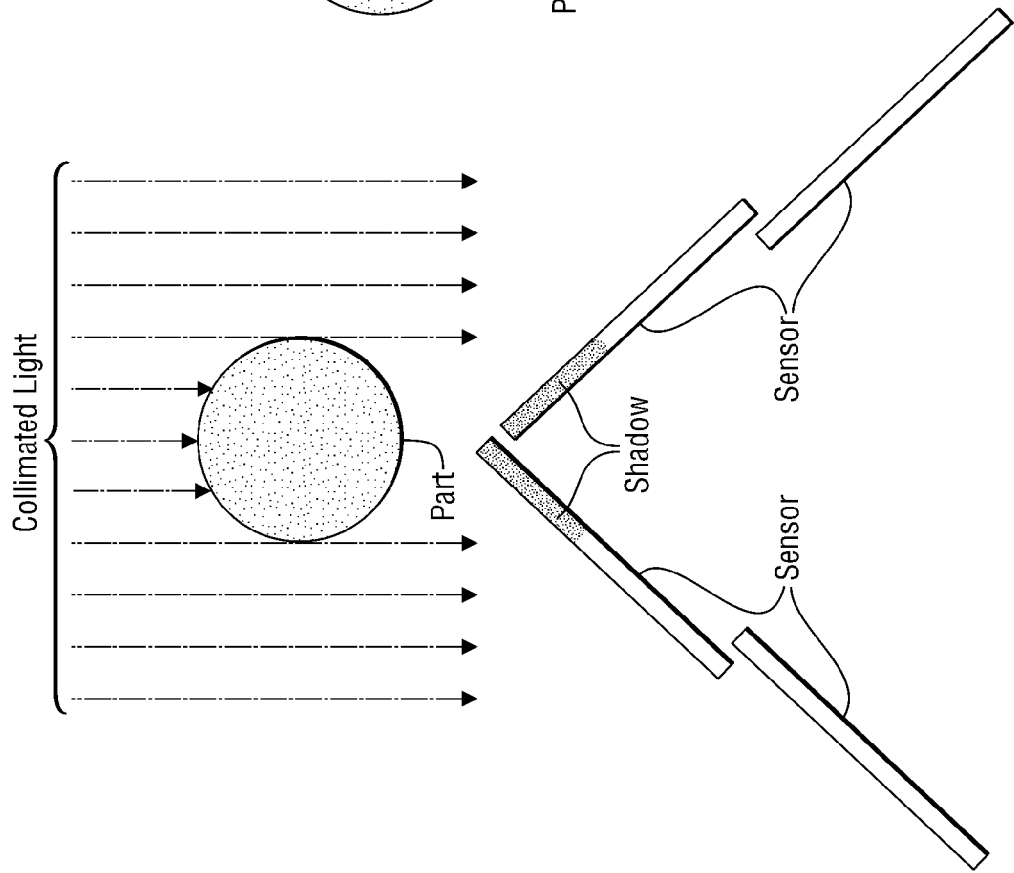

The prior art typically includes a gap between adjacent photo sensors or detectors. This imposes a lower limit on the size of parts that can be measured. However, this gap can be eliminated by moving the left and right sensors so that they overlap with respect to the parts as shown in FIG. 8. By overlapping the sensors the lower limit is eliminated so the optical instrument will be able to measure any part that can be placed such that each side of its shadow falls on each side of the sensors.

Because the sensors are overlapped there is no gap between for the sensors. All parts of the shadow must fall on the sensors. However, the part is only measureable if one side of the part falls on each side of the sensors.

SUMMARY

This application describes improvements for photo sensors and/or detectors used in various inspection and sorting instruments. Multiple improvements can be implemented in any combination or together for maximum benefit. These improvements include:

1) Angle the sensors with respect to the collimated light. This increases measurement resolution by magnifying or spreading out the collimated light. The collimated light can also be optically magnified. Also, the collimated light can be optically split and imaged on multiple photo detectors.

2) Use multiple sensors in a staggered formation to extend the maximum size of a part that can be measured.

3) Overlap the sensors on each side to eliminate the present gap between sensors. With this change there is no lower limit to the width of parts that can be measured.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A high-resolution imaging and processing method of increasing the range of a geometric dimension of a part that can be determined, the method including the steps of supporting with a support a part having a width, directing from at least one radiation source at least one plane of collimated radiation in a sensing direction at a surface of the part, wherein each of the planes is occluded by the part to create unobstructed first and second planar portions of the plane of radiation passing by and not blocked by the supported part and to cast a radiation shadow of the supported part, wherein each of the first and second planar portions has a width and contains an amount of radiation which is representative of a respective geometric dimension of the supported part to be determined, and measuring by a receiver module the amount of radiation in each of the first and second planar portions imaged on first and second predetermined measuring areas, respectively, to determine the geometric dimension, the improvement comprising:

utilizing at least one optical component to increase the width and decrease the intensity of the first and second planar portions imaged on the first and second predetermined measuring areas, respectively, to obtain elongated first and second planar portions, respectively, and to produce first and second electrical signals, respectively;

providing third and fourth predetermined measuring areas adjacent the first and second predetermined measuring areas, respectively, to image at least a portion of the elongated first and second planar portions, respectively, thereon and to produce third and fourth electrical signals, respectively; and processing by at least one processor the first, second, third and fourth electrical signals to determine the geometric dimension with enhanced accuracy.

2. The method as claimed in claim 1, wherein the first and third measuring areas are staggered and the second and fourth measuring areas are staggered.

3. The method as claimed in claim 1, wherein the first and third measuring areas are angled at a first angle with respect to the width of the part and the second and fourth measuring areas are angled at the same second angle with respect to the width of the part.

4. The method as claimed in claim 3, wherein the first and second angles are substantially equal.

5. The method as claimed in claim 1, wherein the first and second measuring areas are substantially perpendicular to each other and wherein the third and fourth measuring areas are substantially perpendicular to each other.

6. The method as claimed in claim 1, wherein there is substantially no gap between the first and second measuring areas on which to cast the radiation shadow.

7. The method as claimed in claim 1, wherein the radiation is laser radiation.

8. The method as claimed in claim 1, wherein the radiation is visible radiation.

9. The method as claimed in claim 1, wherein the radiation is light radiation.

10. A high-resolution imaging and processing system for increasing range of a geometric dimension of a part that can be determined in the system, the system including a support for supporting a part having a width and at least one transmitter-receiver pair, each pair including a radiation source for directing a plane of collimated radiation at a surface of the part so that the part occludes each plane of radiation to create unobstructed first and second portions of the plane of radiation passing by and not blocked by the supported part and to cast a radiation shadow of the supported part, wherein each of the unobstructed first and second planar portions has a width and contains an amount of radiation which is representative of a respective geometric dimension of the part to be determined, each pair also including a receiver module for measuring the amount of radiation in the unobstructed first and second planar portions imaged on first and second predetermined measuring areas, respectively, the improvement comprising:

at least one optical component to increase the width and decrease the intensity of the first and second planar portions imaged on the first and second predetermined measuring areas, respectively, to produce first and second electrical signals, respectively;

third and fourth predetermined measuring areas, respectively, adjacent to the first and second measuring areas, respectively, to image at least a portion of the first and second planar portions, respectively, to produce third and fourth electrical signals, respectively; and at least one processor to process the first, second, third and fourth electrical signals to determine the geometric dimension with enhanced accuracy.

11. The system as claimed in claim 10, wherein the first and third measuring areas are staggered and the second and fourth measuring areas are staggered.

12. The system as claimed in claim 10, wherein the first and third measuring areas are angled at a first angle with respect to the width of the part and the second and fourth measuring areas are angled at a second angle with respect to the width of the part.

13. The system as claimed in claim 12, wherein the first and second angles are substantially equal.

14. The system as claimed in claim 10, wherein the first and second measuring areas are substantially perpendicular to each other and wherein the third and fourth measuring areas are substantially perpendicular to each other.

15. The system as claimed in claim 10, wherein photodetectors have each of the predetermined measuring areas.

16. The system as claimed in claim 15, wherein the photodetectors comprise at least one of photocells, linear sensor arrays and photodiodes.

17. The system as claimed in claim 10 further comprising an actuator mechanism for moving each pair in unison relative to the part to scan the part with each plane of radiation.

18. The system as claimed in claim 10, wherein the radiation is laser radiation.

19. The system as claimed in claim 10, wherein the radiation is visible radiation.

20. The system as claimed in claim 10, wherein the radiation is light radiation.

* * * * *